United States Patent [19]

Morin

[11] 4,318,627
[45] Mar. 9, 1982

[54] BALL AND SOCKET ARTICULATED JOINT

[75] Inventor: Gérard Morin, Libiaire, France

[73] Assignee: Societe Anonyme D.B.A., Paris, France

[21] Appl. No.: 150,259

[22] Filed: May 15, 1980

[30] Foreign Application Priority Data

May 15, 1979 [FR] France ............................ 79 12295

[51] Int. Cl.³ ............................................ F16C 11/06
[52] U.S. Cl. ..................................... 403/133; 403/140
[58] Field of Search ............... 403/140, 136, 135, 133, 403/139

[56] References Cited

U.S. PATENT DOCUMENTS

| | | | |
|---|---|---|---|
| 3,530,495 | 9/1970 | Kindel | 403/140 |
| 3,787,127 | 1/1974 | Cutler | 403/140 X |
| 3,862,807 | 1/1975 | Doden | 403/135 |

FOREIGN PATENT DOCUMENTS 1588729 of 1970 France.

*Primary Examiner*—Andrew V. Kundrat
*Attorney, Agent, or Firm*—Paul David Schoenle; Ken C. Decker

[57] ABSTRACT

The articulated joint consists of a spherical ball with a stem which is assembled to pivot in a housing by means of a bearing member made from plastics material having an annular flange supported by a closing washer and provided with a series of slots which subdivide it into petals arranged between the ball and the bottom of the housing. The petals are in the form of wedges and are loaded by elastic elements made of the same material as the spherical ball race and which bear on the annular flange to ensure the preloading and automatic taking up of play.

2 Claims, 4 Drawing Figures

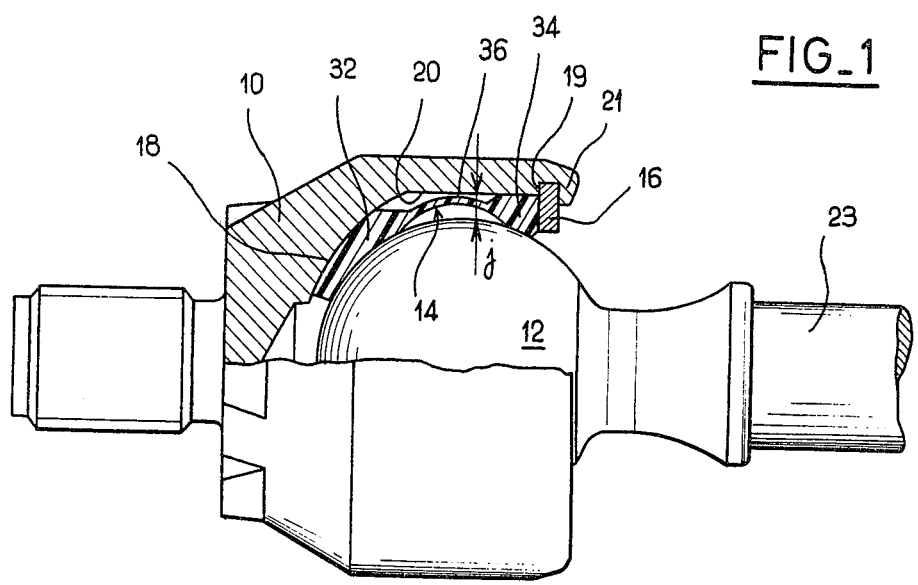
FIG_1
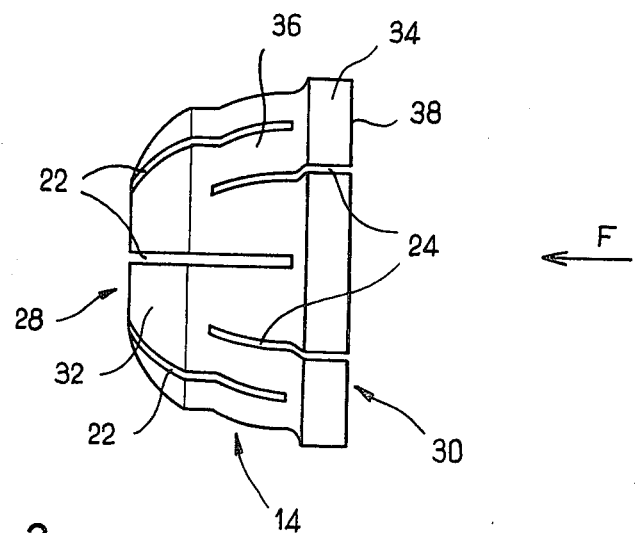
FIG_2

BALL AND SOCKET ARTICULATED JOINT

The object of the invention is a ball and socket joint, especially for suspension or steering of an automobile vehicle; it is especially an articulated joint of preloaded type with automatic takeup of play.

The known swivel joints generally consist of a housing in which the spherical ball of a pivot is covered by a bearing member made from plastics material, the latter being held in the said casing by a closing washer.

In joints of this type the preload is usually ensured on assembly by an initial compression of the bearing member when this consists of one or several blocks of elastomer material; in the case of wear of the bearing member, it is observed that the initial preload disappears, hence no longer ensuring the desired characteristics of functioning of the articulated joint. Another solution consists of using elastic springs or washers in such a manner as to obtain the desired preload of the articulated joint; the drawback of this solution is that it is expensive because it requires additional components whose assembly is complicated.

In order to attempt to eliminate these drawbacks a first solution was presented in the French Pat. No. 1,588,729 which proposes a ball and socket joint in which a spherical ball equipped with a stem is assembled to pivot in a housing by means of a bearing member made from plastics material having an annular flange which is supported on a closing element of the said housing in such a manner as to support one of the two hemispheres of the said spherical ball defined by an equatorial plane perpendicular to the axis of the said threaded stem, said bearing member consisting also of a part provided with a first series of slots distributed regularly and expanding along the meridian lines of the said spherical ball in such a manner as to subdivide said part into segments in the form of petals arranged between the other of the said two hemispheres and the spherical or truncated conical inset bottom of the said housing.

However, this solution is not satisfactory for the following reasons. When the joint is compressed by exerting a considerable axial force on the stem of the ball, it is observed that the latter moves axially in relation to the housing in opposition to the elastic forces exerted by the portion of the seat which forms an elastic washer; this movement is particularly harmful when such an articulated joint is used in the steering of a vehicle because its consequence is an axial play in the articulated joint which causes a dead travel when the driver applies a torque to the steering wheel of the vehicle.

The object of the invention is to remedy this defect and it proposes a ball joint of the type described above, characterized in that the said petals are in the form of wedges and are connected to the said annular flange by connection elements which are of the same material as the said annular flange and the said petals in the form of wedges, the said connection elements stretching according to the meridian lines and presenting a reduced lateral section which permits the bending or buckling in the defined space between the spherical ball and the internal wall of the housing on assembly of the articulated joint so that the said connection elements elastically load the petals in the form of wedges with a view to ensuring the preload of the articulated joint and the automatic taking up of the play.

The invention will now be described referring to the attached drawing in which:

FIG. 1 is a view in partial axial cross section of a ball joint according to the invention;

FIG. 2 is a lateral view of the bearing member shown in FIG. 1;

Figure 4:
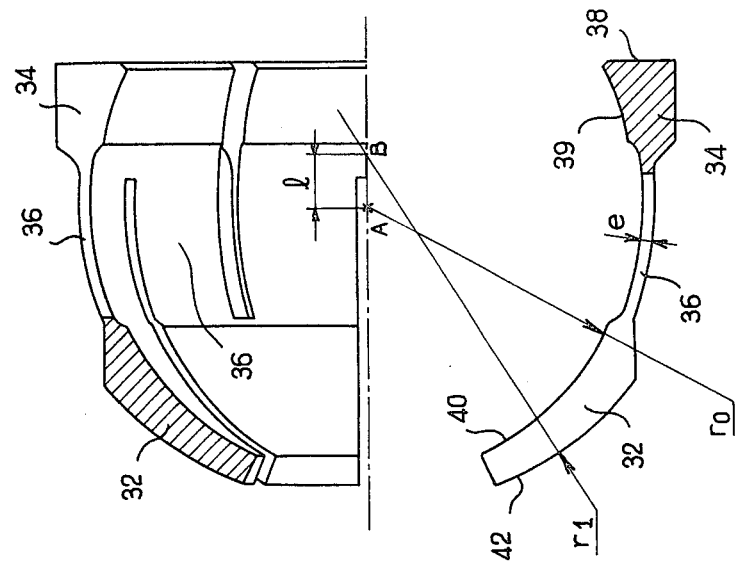
FIG. 4 is a cross sectional view along the line 4—4 of FIG. 3.

The ball joint represented in FIG. 1 includes a housing 10 in which a spherical ball 12 is assembled to pivot by means of a bearing member 14, the whole being held inside the housing 10 by a closing washer 16.

The housing 10 has a blind stepped bore 20 whose part with smaller diameter receives the bearing member 14 which is in contact with a hollow spherical surface 18 formed at the blind end of the bore 20; the closing washer 16 being fixed in the portion of larger diameter of the bore 20 by setting of the extreme part 21 of the housing 10.

Figure 3:
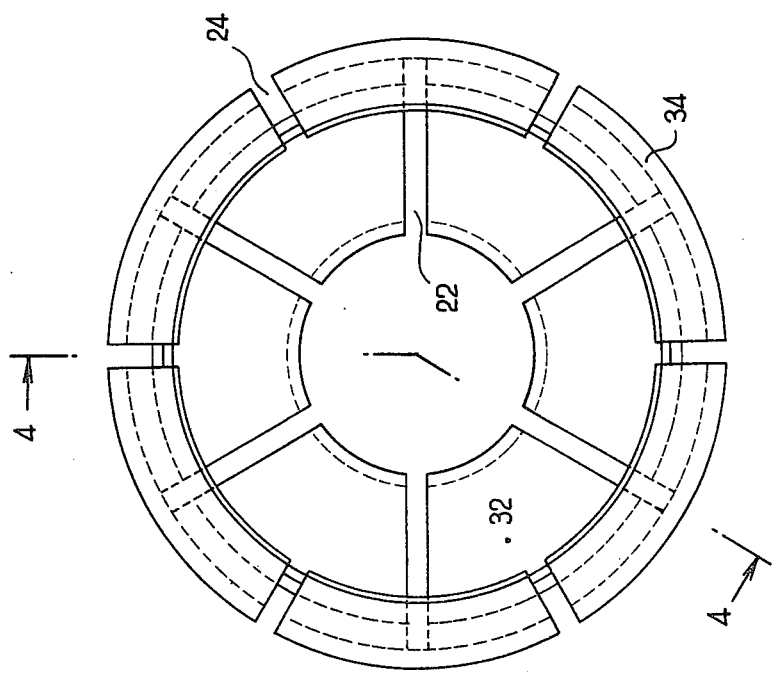
FIG. 3 is an enlarged view according to the arrow F of the bearing shown in FIG. 2.

The bearing member 14 (shown separately in FIG. 2 and in cross section in FIGS. 3 and 4) is made from a plastics material which has good wear and friction characteristics. The bearing member 14 is provided with two series of slots 22 and 24 which extend in alternating pattern from the two end parts 28 and 30, each of these two parts being in contact with one of the two hemispheres of the spherical ball 12 defined by an equatorial plane perpendicular to the axis of the stem 23 of the ball. The slots 22 and 24 extend in alternating pattern from the two end parts 28 and 30 along meridian lines, distributed circumferentially, beyond the equatorial plane defined above. In the embodiment shown, each of the two series consists of six slots which each divide two end parts 28 and 30 into six elements in the form of petals 32 and 34 respectively. The end parts of the slots 22 and 24 define between themselves twelve elements 36 in the form of blades. As can be observed the thickness "e" of the blades 36 is less than the radial play "j" which exists between the spherical ball 12 and the internal wall of the bore 20 of the housing 10. The end part or annular flange 30 of the bearing member 14 is interposed between one of the said two hemispheres and the closing washer 16 and is supported on the latter by means of bearing face 38 of the same material as the bearing member. The internal spherical profile 39 of the element 34 has a radius equal to that of the spherical ball 12. The end part 28 is divided into six elements in the form of petals 32 which have a wedge shape; in fact as can be observed from FIG. 4, the internal spherical profile 40 and external profile 42 have radii $r_0$ and $r_1$ which are equal to the radii of the sphere 12 and of the concave surface 18 but their respective points of convergence A and B on the main axis of the bearing race 14 are spaced at a distance "1".

The assembly of the joint represented in FIG. 1 is carried out in the following manner:

The spherical ball 12, which was previously covered elastically with the bearing member 14, is introduced into the housing 10 and it is pressed to rest against the concave spherical surface 18 by means of a force applied to stem 23. The end part 30 of the bearing race 12 is pushed into position by means of the closing washer 16 which is supported on the wedge face 38 and comes into contact with the shoulder 19 which demarcates the two portions of the stepped bore 20. After having set the end part 21 of the housing 10, the effort applied to the spherical ball is withdrawn, the elements in the form of a wedge 32 then take up the play under the action of the thrust transmitted by the blades 36. In fact, the bearing member is assembled in such a manner that the blades are braced and generate a thrust force in axial direction on the wedges 32 making it possible to obtain the automatic takeup of the play and the desired preload of the joint.

"The angle" of the wedges 32, owing to the technical characteristics set forth above, is slightly greater than the friction angle between the spherical ball 12 and the bearing race 14 in such a manner that there is no jamming and in such a manner that the force of expulsion of the wedges 32 under the effect of the compression forces applied to the ball when it is used, is compensated by the axial thrust of the blades 36.

I claim:

1. Ball joint especially for suspension or steering of an automobile vehicle in which a spherical ball equipped with a stem is assembled to pivot in a housing by means of a bearing member made from plastic material, said bearing member including an annular flange which is supported on a closing element of said housing in such a manner as to support one of the two hemispheres of the said spherical ball separated by an equatorial plane perpendicular to the axis of said stem said bearing member having a part provided with a first series of slots extending along the meridians defined by said spherical ball in such a manner as to subdivide the said part into segments in the form of petals arranged between the other of the said two hemispheres and said housing, characterized in that the said petals are tapered in the form of wedges and are connected to said annular flange by connection elements integral with said annular flange and said petals, said connection elements presenting a reduced lateral cross section which is proportioned in length to permit the bending or buckling thereof in the space defined between the spherical ball and the internal wall of the housing on assembly of the articulated joint so that said connection elements elastically load the petals in the form of wedges with a view to ensuring the preloading of the joint and the automatic taking up of the play.

2. Ball joint according to claim 1, characterized in that said annular flange is also provided with a second series of slots distributed regularly thereon which extend along the meridian lines of said spherical ball, said first and second series of slots extending in identical number and in alternating pattern beyond said equatorial plane in such a manner as to substantially define said connection elements between themselves, the latter being presented in the form of blades whose thickness is less than the radial play which exists between the sperical ball and the housing.

* * * * *